US008853974B2

(12) United States Patent
Devos et al.

(10) Patent No.: US 8,853,974 B2
(45) Date of Patent: Oct. 7, 2014

(54) METHOD FOR HOT CONNECTING A MOTOR TO A VARIABLE SPEED DRIVE

(75) Inventors: Thomas Devos, Carrières sous Poissy (FR); François Malrait, Jouy sur Eure (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 287 days.

(21) Appl. No.: 13/529,285

(22) Filed: Jun. 21, 2012

(65) Prior Publication Data

US 2013/0015787 A1    Jan. 17, 2013

(30) Foreign Application Priority Data

Jul. 12, 2011  (FR) ...................................... 11 56339

(51) Int. Cl.
*H02P 1/54* (2006.01)
*H02P 5/74* (2006.01)
*H02P 1/58* (2006.01)

(52) U.S. Cl.
CPC ... *H02P 1/58* (2013.01); *H02P 5/74* (2013.01)
USPC ........... 318/102; 318/705; 318/712; 318/721; 318/778; 318/268; 180/65.265; 62/158; 62/228.4; 62/129

(58) Field of Classification Search
CPC .............. Y02T 10/642; Y02T 10/7258; B60L 2240/486; B60L 2240/421; B60L 2240/423; H02P 6/20; H02P 1/04; H02P 2207/05
USPC ............. 180/65.265; 318/268, 705, 712, 721, 318/778; 62/158, 228.4, 126; 307/19
See application file for complete search history.

(56) References Cited

U.S. PATENT DOCUMENTS

| 4,703,431 | A | * | 10/1987 | Sako et al. ..................... 700/142 |
| 4,967,096 | A | * | 10/1990 | Diemer et al. .................. 307/19 |
| 7,650,956 | B2 | * | 1/2010 | Hirata et al. .................. 180/248 |
| 7,805,973 | B2 | * | 10/2010 | Bosga et al. ................. 72/452.5 |
| 8,403,807 | B2 | * | 3/2013 | Tabata et al. ...................... 477/3 |

FOREIGN PATENT DOCUMENTS

| JP | 58-207897 | 12/1983 |
| JP | 59-123489 | 7/1984 |
| JP | 59-198887 | 11/1984 |

OTHER PUBLICATIONS

French Preliminary Search Report and Written Opinion issued Mar. 19, 2012, in French 1156339, filed Jul. 12, 2011 (with English Translation of Categories of Cited Documents).

* cited by examiner

*Primary Examiner* — Rita Leykin
(74) *Attorney, Agent, or Firm* — Oblon, Spivak, McClelland, Maier & Neustadt, L.L.P.

(57) ABSTRACT

A method for connecting a second motor to a variable speed drive in parallel with at least one existing motor under load and controlled by the variable speed drive is provided. The method disconnects the existing motor from the variable speed drive and a state estimator calculates transient state of the existing motor including at least the speed of the existing motor based on a previously established load model. The method then connects the second motor to the variable speed drive and the second motor is operated using a suitable directive until the actual state of the second motor attains the calculated transient state of the existing motor at a given time. Upon attaining the calculated transient state, the existing motor is reconnected to the variable speed drive such that no current spike is generated in the aforementioned process.

5 Claims, 2 Drawing Sheets

METHOD FOR HOT CONNECTING A MOTOR TO A VARIABLE SPEED DRIVE

TECHNICAL FIELD OF THE INVENTION

The present invention pertains to a method for connecting an additional motor to a variable speed drive already under load and connected to at least one other motor. The method according to the invention provides for the hot connecting of the additional motor, with no short-circuit—or bypass according to the term of the art—of the said variable speed drive for powering the at least one first motor.

PRIOR ART

In a known manner, a single variable speed drive can manage several motors in parallel, at least asynchronous motors.

Patent application EP1426620 describes an example of such a system. To allow the hot connection of an additional motor in parallel with a first motor already under load to one and the same variable speed drive, document EP1426620 discloses a method comprising in particular the disconnecting of the first motor from the variable speed drive and its connection to the network. Thereafter, the additional motor is connected to the variable speed drive. This method is representative of the prior art and exhibits several drawbacks.

Firstly, according to this known document, the necessity to connect an additional motor arises when the first motor is at full load and more power is required. In this case, during a first phase, the first motor is disconnected from the variable speed drive and connected to the electrical supply network so that it operates continuously at full output. During a second phase, the additional motor is connected to the variable speed drive. This method involves a loss of control of the first motor from the variable speed drive. Moreover, during the first phase, a current spike is generated by the connecting of the first motor to the network.

A variant known from the prior art consists in having all the motors connected to the output of a variable speed drive. In this case, the motors remain permanently controllable. The state of the art in this type of scheme provides for the addition or the removal of the motors via a phase of stopping the said motors. With no particular sequence, the hot direct connecting of the additional motor to the variable speed drive causes a current spike that could be significant and might cause impairment of the said additional motor.

The aim of the invention is therefore to propose a solution for hot connecting an additional motor to a variable speed drive not requiring, by definition, any stopping of the system, not involving any bypass of the variable speed drive for the motor or motors already under load, and, especially, not causing any significant current spike that might impair the additional motor.

DISCLOSURE OF THE SUBJECT OF THE INVENTION

For this purpose, the subject of the present invention is a method for connecting an additional motor to a variable speed drive in parallel with at least one first motor under load, controlled by the said variable speed drive; the method according to the invention advantageously comprises the following steps:

the disconnecting of the at least one first motor from the variable speed drive;
the implementing of a state estimator of the at least one first motor, based on a previously established load model of the said at least one first motor, the said state estimator being able to calculate the evolution over time of an estimated state of the at least one first motor, the said estimated state comprising at least the speed of the said at least one first motor;
the connecting of the additional motor to the variable speed drive;
the starting of the additional motor with the directive of attaining the estimated state of the at least one first motor;
when the state of the additional motor attains the estimated state of the at least one first motor, the reconnecting of the said at least one first motor.

Advantageously, the method according to the invention can furthermore comprise, prior to the step of reconnecting the at least one first motor, a step of disconnecting the additional motor, followed by a step of reconnecting the additional motor substantially simultaneously with the reconnecting of the at least one first motor.

According to one embodiment of the invention, the state estimator of the at least one first motor is able to calculate the evolution over time of the estimated state of the said at least one first motor, the said estimated state comprising, in addition to its speed, the electric flux of the said at least one first motor.

According to one embodiment of the invention, the state estimator of the at least one first motor is able to calculate the evolution over time of the estimated state of the said at least one first motor, the said estimated state comprising, in addition to its speed, the angle of the rotor of the said at least one first motor.

According to the invention, the said at least one first motor can consist of a plurality of motors connected in parallel.

BRIEF DESCRIPTION OF THE FIGURES

Other characteristics and advantages will become apparent in the detailed description which follows, given with regard to the appended drawings which represent.

DETAILED DESCRIPTION OF AT LEAST ONE EMBODIMENT

Figure 1:
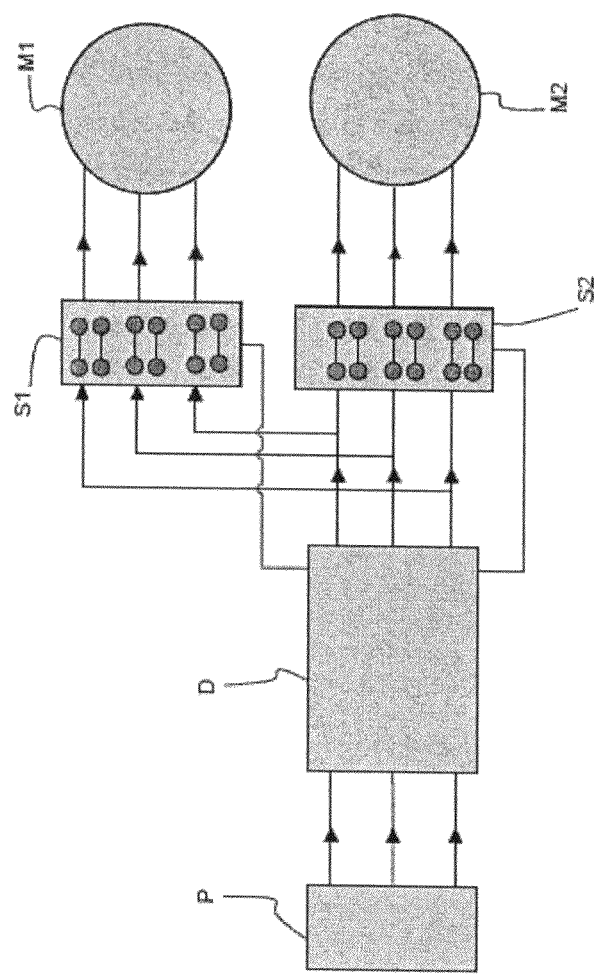
FIG. 1: the basic diagram of a system comprising a variable speed drive controlling at least two motors in parallel.

With reference to FIG. 1, a variable speed drive D, powered by a supply network P, is connected to two motors M1, M2 in parallel by way of two respective contactors S1, S2. The method according to the invention takes place in the context where a first motor M1 is under load, connected to the variable speed drive D, when an order to start an additional motor M2 is given. The invention proposes a sequence making it possible to culminate in a situation in which the first motor M1 and the additional motor M2 are connected to the variable speed drive D, without the hot connection of the additional motor M2 giving rise to any current spike that is potentially dangerous for the said additional motor M2.

Figure 2:
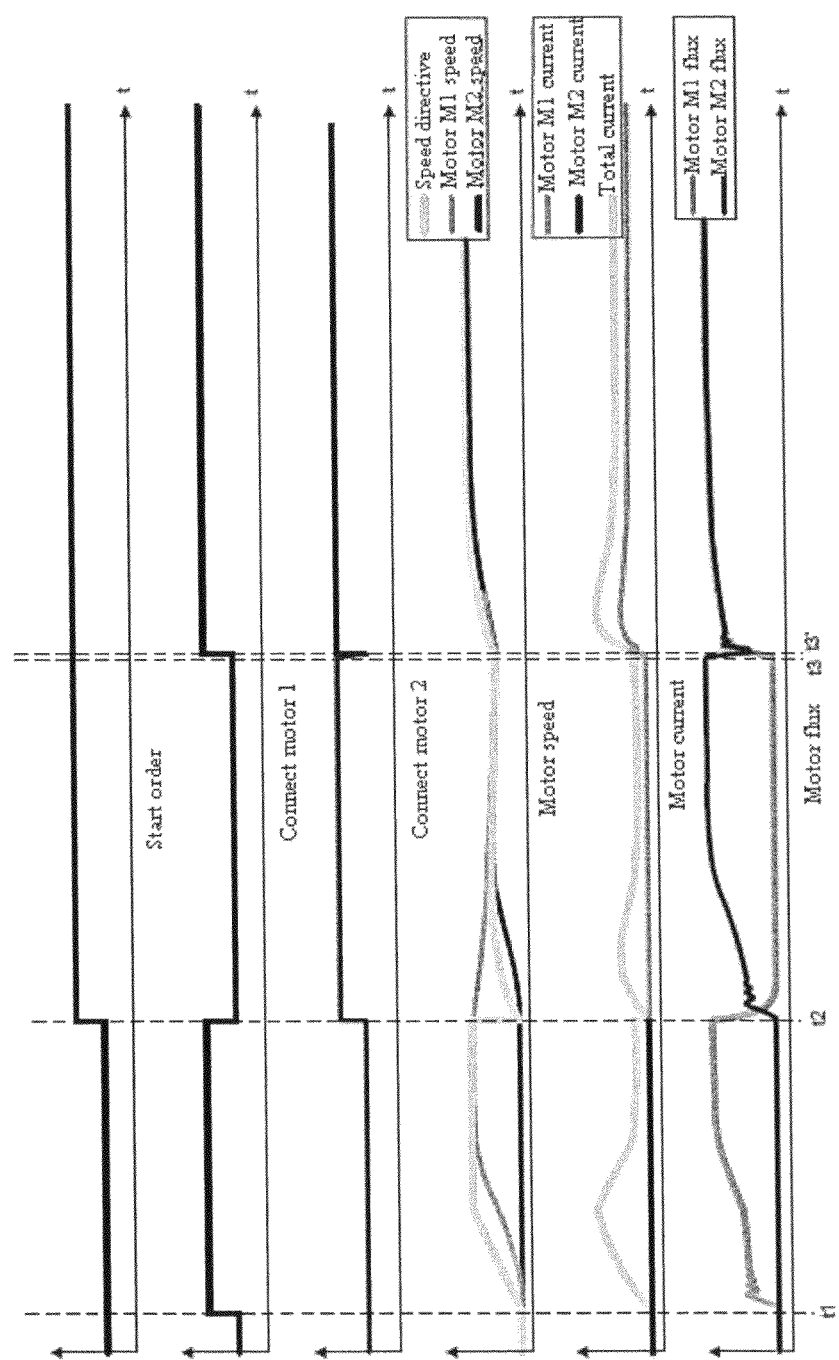
FIG. 2: the temporal sequence diagram of the method according to the invention.

FIG. 2 presents the temporal sequencing of the method according to the invention.

As mentioned previously, the method according to the invention is implemented in the context where at least one first motor M1 is under load, started from an instant t1 and controlled by a variable speed drive D, and where an order to start an additional motor M2, in parallel with the said at least one first motor M1, is given at an instant t2.

The complete state of a motor such as the first motor M1 or the additional motor M2 is given by the equations hereinbelow. Concerning the mechanical state (speed, angle) and the electrical state (flux, current) of the said motor, the following equations are satisfied:

$$L_F \frac{di_s}{dt} = u_s - (R_s + R_{req} + jL_F\omega_s)i_s + (T_r^{-1} - j\omega_r)\varphi \quad (1)$$

$$\frac{d\varphi_r}{dt} = -(T_r^{-1} + j(\omega_s - \omega_r))\varphi_r + R_{req}i_s \quad (2)$$

$$\frac{J}{n_p}\frac{d\omega_r}{dt} = \frac{3}{2}n_p\text{Im}(\varphi_r^* i_s) - \tau \quad (3)$$

With:

$$\frac{d\theta}{dt} = \omega_r$$

$$i_s = i_{sd} + ji_{sq}$$

$$\varphi_r = \varphi_{rd} + j\varphi_{rq}$$

and:

$\omega_r$: the rotation speed of the rotor
$\theta$: the angle of the rotor
$\omega_s$: the stator rotation speed
$i_s$: the stator current
$u_s$: the voltage applied
$\phi_r$: the rotor flux The motor parameters are:

$R_s$: the stator resistance
$L_F$: the leakage inductance
$R_{req}$: the equivalent rotor resistance $$\left(R_{req} = R_r\left(\frac{L_M}{L_r}\right)^2\right)$$

with $R_r$: the rotor resistance
$L_M$: the mutual inductance
$L_r$: the rotor inductance
$T_r$: the rotor time constant $$\left(T_r = \frac{R_r}{L_r}\right)$$

J: the inertia of the rotor
$n_p$: the number of pairs of poles

In this context, the method according to the invention comprises a set of successive steps whose sequencing is represented in FIG. 2.

The first step consists in disconnecting the said at least one first motor M1 at the moment at which the order to start the additional motor M2 is given, at the instant t2. Consequently, as shown by the charts of FIG. 2, the speed of the at least one first motor M1 decreases, its electric flux decreases very quickly and its current vanishes.

On account of the vanishing of the current present in the first motor M1, equations (1), (2) and (3) become:

$$u_{s1} = -(T_r^{-1} - j\omega_{r1})\varphi_{r1} \quad (1)$$

-continued $$\frac{d\varphi_{r1}}{dt} = -T_r^{-1}\varphi_{r1} \quad (2)$$

$$\frac{J}{n_p}\frac{d\omega_{r1}}{dt} = -\tau \quad (3)$$

With:

$$\frac{d\theta_1}{dt} = \omega_{r1}$$

$$i_{s1} = 0$$

$$\omega_{s1} = \omega_{r1}$$

An estimator, previously established by known methods, calculates the evolution over time of an estimated state of the said at least one first motor M1. This estimated state exhibits at least one mechanical component comprising at least the speed of the at least one first motor M1. This mechanical component is estimated on the basis of a load torque model of the application considered. For example, the load torque of a fan exhibits a form like $k^*w_1^2$, with $w_1$ the speed of the motor of the said fan. The mechanical state can also comprise the angle of the rotor of the at least one first motor M1 for optimal operation of the proposed sequencing, not giving rise to any current spike during the changes of phases.

The estimated state calculated by the estimator can also exhibit an electrical component comprising the electric flux of the at least one first motor M1 and/or the intensity of the current of the at least one first motor M1.

Substantially at the same instant t2 at which the order to start the additional motor M2 is given, that is to say simultaneously or just before or just after, the additional motor M2 is connected to the variable speed drive D, with an initially zero speed directive, and then a global directive to tend towards the estimated state of the at least one first motor M1. Tending towards the estimated state of the at least one first motor M1 consists in the additional motor M2 at the minimum attaining at a given instant, via a suitable directive, a speed equal to the speed of the at least one first motor M1 at the same instant.

For optimal operation, tending towards the estimated state of the first motor M1 consists in the additional motor M2 attaining the estimated speed, estimated angle and estimated flux of the first motor M1. Thus, no overcurrent is produced during the closing of the contactors and the state of the first motor M1 and of the additional motor M2 (current, flux, speed, angle) is under control at any moment.

Upon the substantially simultaneous reconnection of the first motor M1 and of the additional motor M2, equations (1), (2) and (3) may be written:

$$L_F \frac{d\Delta i_s}{dt} = -(R_s + R_{req} + jL_F\omega_s)\Delta i_s + (T_r^{-1} - j\omega_{r1})\Delta\varphi_r - j\Delta\omega_r \quad (1)$$

$$\frac{d\Delta\varphi_r}{dt} = -(T_r^{-1} + j\omega_s)\Delta\varphi_r + j\Delta\omega_r\varphi_{r2} + R_{req}\Delta i_s \quad (2)$$

$$\frac{J}{n_p}\frac{d\Delta\omega_r}{dt} = \frac{3}{2}n_p(\Delta\varphi_{rd}i_{sq1} + \varphi_{rd2}\Delta i_{sq} - \Delta\varphi_{rq}i_{sd1} + \varphi_{rq2}\Delta i_{sd}) \quad (3)$$

With:

$$\frac{d\Delta\theta}{dt} = \Delta\omega_r \text{ and } \Delta x = x_1 - x_2$$

Within the framework of induction motors, since the amplitude of the electric flux drops fairly rapidly during a disconnection, just synchronizing the speed already makes it possible to considerably reduce the current spikes, on condition that the connecting of the additional motor M2 takes place a sufficiently long time after the first disconnection of the at least one first motor M1, so as to guarantee that the residual electric flux of the at least one first motor M1 is small. Within the framework of permanent-magnet synchronous motors, the amplitude of the electric flux being fixed, it is necessary to synchronize the angle and the speed of the additional motor M2 with the angle and the speed of the at least one first motor M1, the flux not being controlled, but assumed identical.

Immediately from the instant t3' at which the state of the additional motor M2 attains the estimated state of the at least one first motor M1, the said at least one first motor M1 is reconnected to the variable speed drive D.

According to a preferred embodiment, before reconnecting the said at least one first motor M1 to the variable speed drive D, the additional motor M2 is briefly disconnected from the variable speed drive D at the instant t3, before the at least one first motor M1 and the additional motor M2 are simultaneously reconnected to the variable speed drive D, at the instant t3'. In this way, at the moment of reconnection, the at least one first motor M1 and the additional motor M2 exhibit an equal intensity of current passing through them since the latter has been reduced to zero by the disconnection. The two complete states of the motors M1 and M2 (speed, angle, flux, current) are therefore entirely equal.

Counting from the instant t3' at which the at least one first motor M1 and the additional motor M2 are both connected to the variable speed drive D, they are simultaneously controlled by the said variable speed drive D.

To summarize, the invention exhibits a method for hot connecting an additional motor to a variable speed drive in parallel with at least one first motor already under load.

It should be noted that for the implementation of the method according to the invention, the said at least one first motor may be a set of motors considered to be an equivalent motor.

The invention claimed is:

1. Method for connecting an additional motor to a variable speed drive in parallel with at least one first motor under load, controlled by the said variable speed drive, comprising the following steps:
   Disconnecting the at least one first motor from the variable speed drive;
   Implementing a state estimator of the at least one first motor, based on a previously established load model of the said at least one first motor, the said state estimator being able to calculate the evolution over time of an estimated state of the at least one first motor, the said estimated state comprising at least the speed of the said at least one first motor;
   Connecting the additional motor to the variable speed drive;
   Starting the additional motor with the directive of attaining the estimated state of the at least one first motor;
   When the state of the additional motor attains the estimated state of the at least one first motor, reconnecting the said at least one first motor.

2. Method according to claim 1, further comprising, prior to the step of reconnecting the at least one first motor, a step of disconnecting the additional motor, followed by a step of reconnecting the additional motor substantially simultaneously with the reconnecting of the at least one first motor.

3. Method according to claim 2, wherein the state estimator of the at least one first motor is able to calculate the evolution over time of the estimated state of the said at least one first motor, the said estimated state comprising, in addition to its speed, the electric flux of the said at least one first motor.

4. Method according to claim 1, wherein the state estimator of the at least one first motor is able to calculate the evolution over time of the estimated state of the said at least one first motor, the said estimated state comprising, in addition to its speed, the angle of the rotor of the said at least one first motor.

5. Method according to claim 1, wherein the said at least one first motor consists of a plurality of motors connected in parallel.

* * * * *